United States Patent
Tamaru et al.

[11] 4,006,585
[45] Feb. 8, 1977

[54] ELECTRONIC TIMEPIECE WITH ELECTROCHROMIC DISPLAY ELEMENT

[75] Inventors: Munetaka Tamaru, Tokyo; Kazunari Kume; Minoru Watanabe, both of Tokorozawa; Hideshi Ohno, Sayama, all of Japan

[73] Assignee: Citizen Watch Co., Ltd., Tokyo, Japan

[22] Filed: Jan. 3, 1975

[21] Appl. No.: 538,327

[30] Foreign Application Priority Data

Jan. 8, 1974 Japan .................. 49-5498

[52] U.S. Cl. .................... 58/50 R; 58/23 R; 350/160 R
[51] Int. Cl.² ........................... G04B 19/30
[58] Field of Search ............ 58/23 R, 50 R, 126 R, 58/128; 350/160 R; 340/335, 373

[56] References Cited
UNITED STATES PATENTS

| | | | |
|---|---|---|---|
| 3,626,410 | 12/1971 | deKoster | 58/126 R X |
| 3,652,149 | 3/1972 | Rogers | 350/160 R |
| 3,712,710 | 1/1973 | Castellion et al. | 350/160 R |
| 3,802,182 | 4/1974 | Fujita | 58/50 R |
| 3,839,856 | 10/1974 | Dargent | 58/152 X |
| 3,839,857 | 10/1974 | Berets et al. | 58/23 R |
| 3,863,436 | 2/1975 | Schwarzschild et al. | 58/50 R |
| R28,199 | 10/1974 | Deb et al. | 340/335 X |

*Primary Examiner*—Ulysses Weldon
*Attorney, Agent, or Firm*—Spensley, Horn & Lubitz

[57] ABSTRACT

An electronic timepiece with a digital display device employing electrochromic materials, such as titanate and niobate, as an electro-optical element. An electrochromic material produces different states of coloration depending upon the polarity of voltage applied thereto for a remarkably long period, and with a minimum of power consumption, whereby the timepiece enjoys a minimization in its size, a long life for its battery, and a variable design in the display.

5 Claims, 11 Drawing Figures

U.S. Patent  Feb. 8, 1977  Sheet 1 of 3  4,006,585
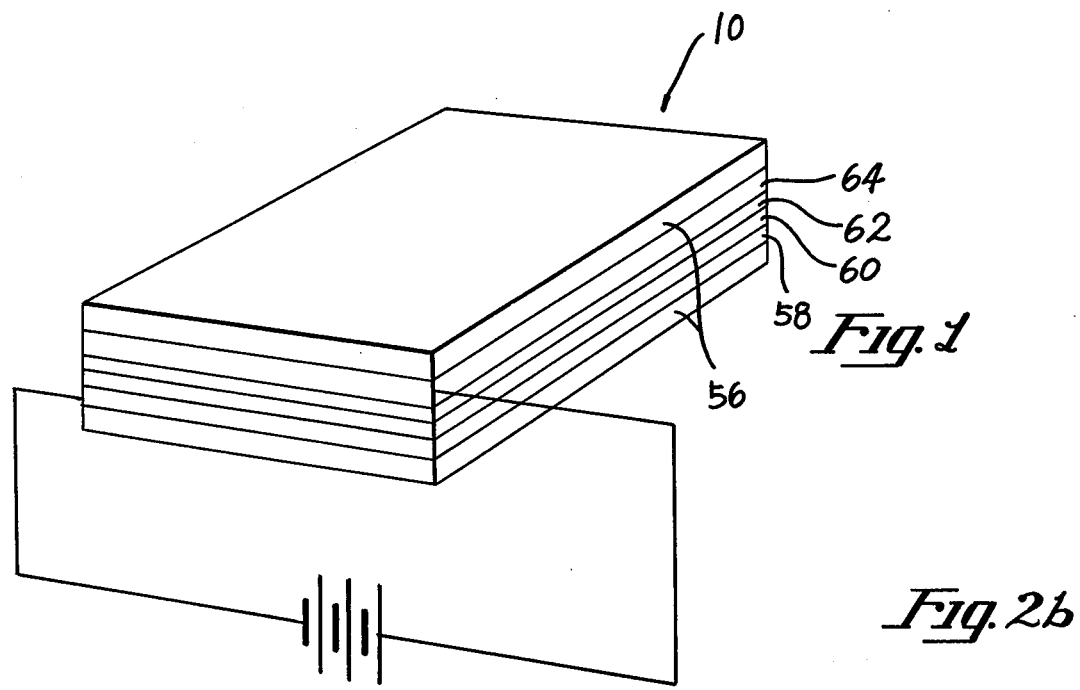
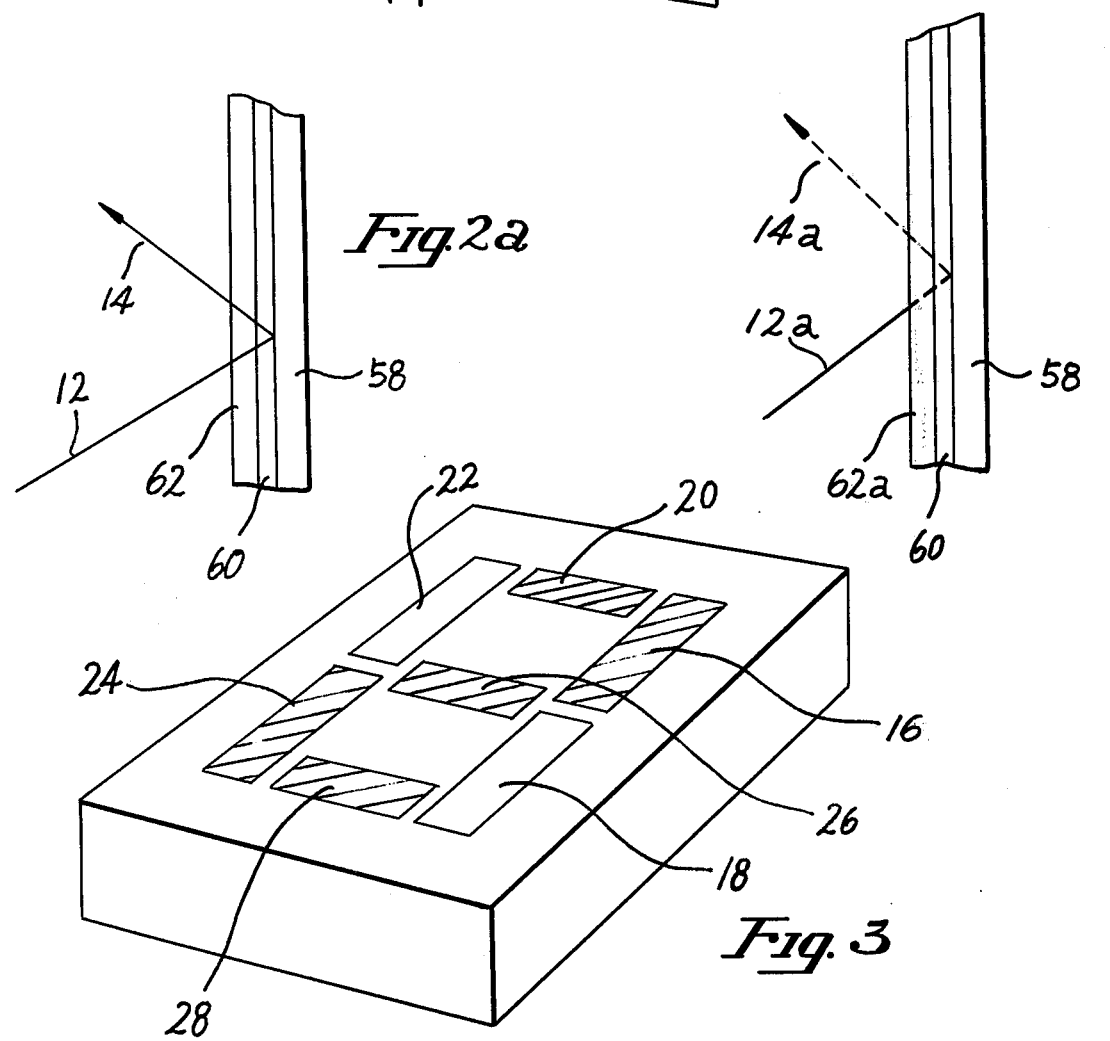

ELECTRONIC TIMEPIECE WITH ELECTROCHROMIC DISPLAY ELEMENT

BACKGROUND OF THE INVENTION

1. Field of the Invention

The present invention relates to an electronic timepiece, and more particularly to an electronic timepiece using persistent electrochromic materials as a display element.

2. Prior Art

Heretofore, digital timepieces have employed light-emitting diodes, liquid crystals, miniature light bulbs and the like as display elements. These display elements, however, require the application of a voltage or electric current for the entire duration of a display and therefore from a power consumption standpoint such displays are unsuitable for use wherein long periods of displays are desired, particularly for calendar displays and the like.

BRIEF SUMMARY OF THE INVENTION

The electronic timepiece of this invention has a greatly improved display system employing electrochromic display elements to overcome the shortcomings which the prior art devices have failed to solve. The primary feature of this invention exists in the material, structure and the arrangement of the display system.

The electrochromic display element, composed of titanate, niobate, 4,4'-dipyridiumate and the like, has several novel characteristics which are different from the conventional prior art display elements. Firstly, the electrochromic material reacts to the application of an electric field. Specifically, the portion of the material to which a voltage is applied changes its color and remains in the changed state for a period of time after the voltage has been removed. The duration of coloration, after removing the voltage, varies up to several hours although shorter and longer durations are also within the scope of this invention. The speed of coloration upon the application of a voltage also varies, some reacting instantaneously and others reacting in several minutes. Secondly, the polarity of a voltage dictates the coloration of a given electrochromic material. For example, neodymium diphthalcyanine turns green in color when a voltage of a given polarity is applied, and becomes transparent over a period of time after the voltage has been removed. The same material turns brown in color when a voltage of the opposite polarity is applied.

Accordingly, the primary object of this invention is to provide a timepiece with a display system which utilizes the electrochromic display elements having the characteristics mentioned above.

Another object of this invention is to provide a timepiece in which the display system is so arranged that the timepiece can be compact, with improved legibility.

The novel features which are believed to be characteristic of this invention, together with further objects and advantages thereof, will be better understood from the following description considered in connection with the accompanying drawings in which presently preferred embodiments of this invention are illustrated by way of example. It should be noted, however, that the drawings are for the purpose of illustration only and are not intended as a definition of the limits of this invention.

BRIEF DESCRIPTION OF THE DRAWINGS

FIG. 1 is a cross-sectional view of an electrochromic element having a solid form of electrochromic material disposed thereon in a first embodiment of this invention.

FIGS. 2A and 2B are diagrammatic illustrations of the principle of electrochromism.

FIG. 3 shows the positions of the segments used in a numerical display.

DETAILED DESCRIPTION OF THE INVENTION

Figure 4:
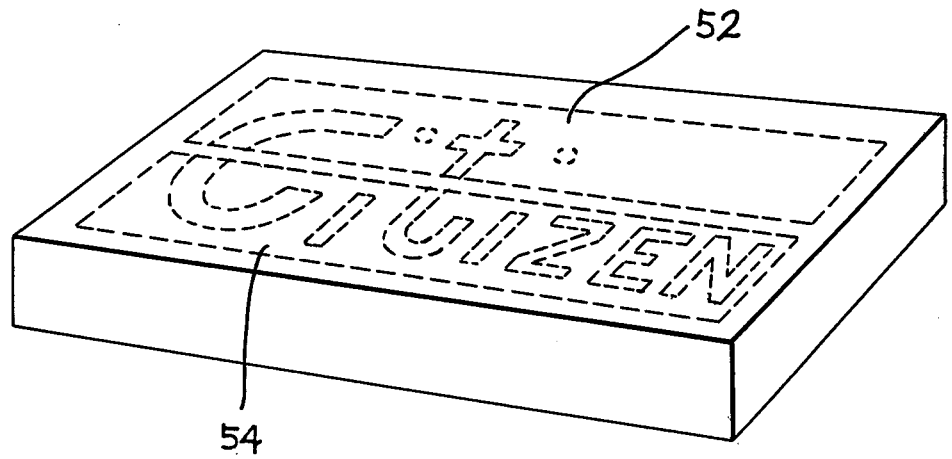
FIG. 4 shows an electrochromic element used in a two-color display in another embodiment of this invention.

Referring first to FIG. 1, there is shown a cross-sectional view of an electrochromic element 10 having disposed thereon a solid form of electrochromic material which is responsive to electron movements. The electrochromic element 10 comprises substrates 56 made of a transparent material such as glass, a reflective electrode 58, an insulator 60 composed of calcium fluoride, silicon monoxide, magnesium fluoride and the like, an electrochromic material 62 such as tungsten oxide, niobium oxide, etc. and a second electrode 64. The second electrode 64 is of optical quality substantially transparent effective to pass light to reflective electrode 58.

FIG. 2A illustrates the modulation of reflected radiation with respect to the timepiece surface. Numeral 12 designates the incident ray and numeral 14 designates the reflected ray. FIG. 2B shows the electrochromic material in a state of coloration upon the application of a voltage. In FIG. 2B, incident ray 12a passes through colored electrochromic layer 62a to reflecting electrode 58, then reflected ray 14a is colorized in accordance with the condition of electrochromic layer 62a.

FIG. 3 shows the disposition of segments used for numerical displays in which seven electrochromic elements as shown in FIG. 1 are placed. By combining the coloration of these seven segments 16 through 28, numerical figures from 0 to 9 are composed and displayed. In the presently preferred embodiment, colored segments 16, 20, 24, 26 and 28 (shown with oblique lines) display the numeral "2". FIG. 4 illustrates that divided sections of a substrate may be presented in different colors by (1) having one kind of electrochromic material disposed on the upper half 52 and another kind of electrochromic material disposed on the lower half; or (2) applying reverse voltages to one kind of electrochromic material disposed separately in upper and lower halves. In the present embodiment, the electrochromic material composed of a mixture of potassium chloride and rare earth element-diphthalocyanine salt is disposed in separate upper and lower sections 52 and 54 respectively of a substrate so that when reverse voltages are applied one section turns green in color and the other section turns brown.

Figure 5:
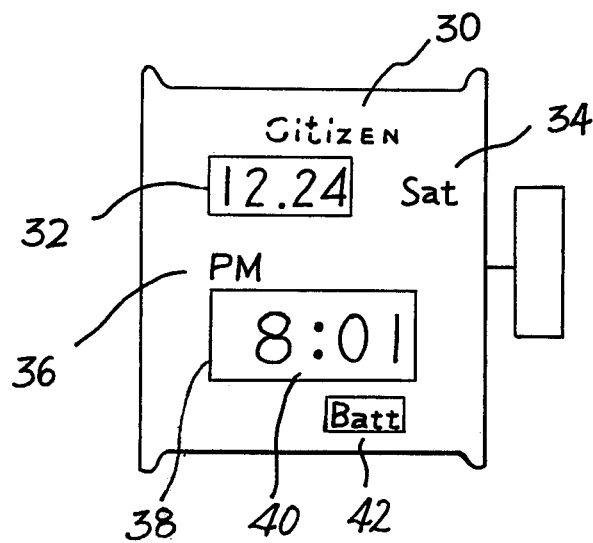
FIG. 5 is the top view of a timepiece.

Referring to FIG. 5, the face of a timepiece is shown, in which letters denoting the maker's name 30 employ the electrochromic element as shown in FIG. 4 such that the upper section is displayed in brown and the lower section is displayed in green, aiming at an interesting design effect. Also displayed are "month" and "date" 32, "day" 34, "AM/PM" 36, "hour" and "minute" 38, "second" indicated by a colon 40, and a battery warning indicator 42. It should be noted that with respect to the "day" display, "Sunday" is presented in a different color from that of the other days by applying a voltage of the opposite polarity to the same segments. If desired, the "AM/PM" display may be presented in two different colors. With respect to the "second" display, the colon changes its color every second. The battery warning indicator, normally invisible, displays the letters "BATT." as the battery strength begins to weaken. These are the preferred functions; others are also within the scope of this invention.

Figure 6:
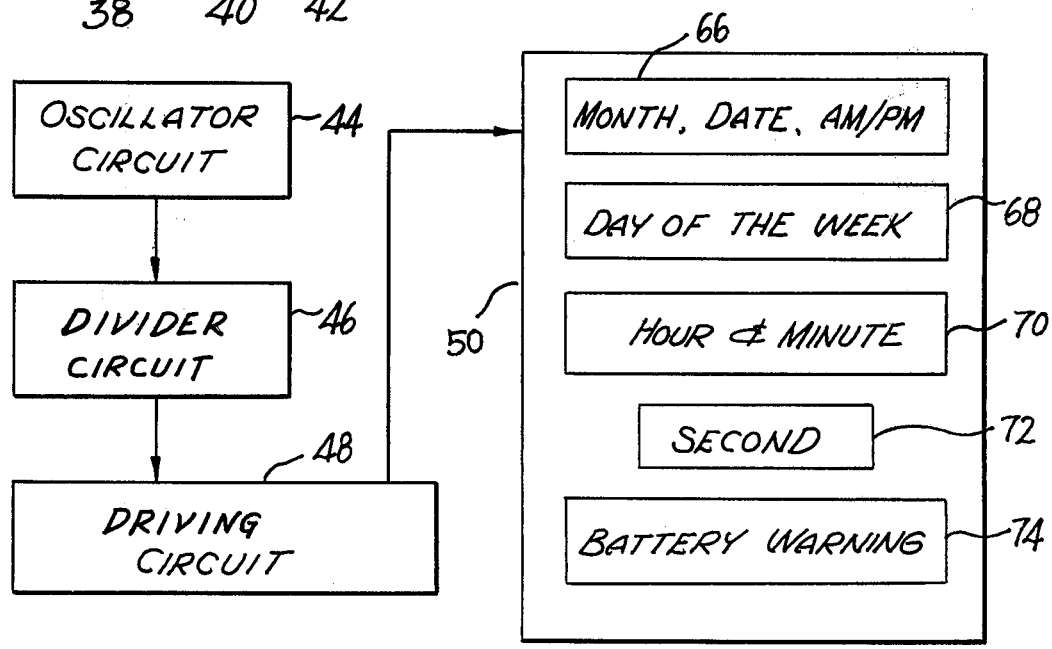
FIG. 6 is a block diagram showing the composition of an embodiment of this invention.

FIG. 6 shows a block diagram of a system employing the present invention, including an oscillator circuit 44 for producing time standards by quartz crystal, tuning fork or other means, a divider circuit 46 for dividing the frequency from the oscillator circuit 44 into a required frequency, a driving circuit 48 for decoding and providing driving output signals from the signals supplied by divider circuit 46, a panel display area 50 on the surface of the timepiece, a "month", "date", and "AM/PM" display 66, a "day" display 68, an "hour" and "minute" display 70, a "second" represented by a colon 72, and a battery warning indicator 74.

With respect to their operation, time standard signals produced by the oscillator circuit 44 are divided into required frequencies by the divider circuit 46. They are then decoded for display in the driving circuit 48 which controls the driving current for coloration. Finally the driving current is disposed to the electrochromic element 10 which changes the coloration of each letter on the display panel 50. The oscillator circuit 44, divider circuit 46, and driving circuit 48 are well known circuitry and have been used extensively in the prior art. Inasmuch as these elements are well known, and do not form any aspect of what Applicant believes to be the distinguishing characteristic of this invention over the prior art, such elements will not be further discussed.

Figure 7:
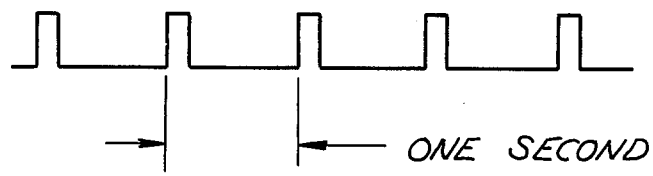
FIG. 7 is a driving wave diagram of a colon used as a "second" indicator.

FIG. 7 shows a driving wave form of the colon 72 to indicate seconds. The electrochromic material used in the colon is selected from those with an extremely short duration of coloration so that when a pulse is received from the driving circuit 48, the colon becomes colored, and when the current is cut off the image fades, becoming colored again at the next pulse current. This operation is repeated to produce alternate coloration and fading of the colon.

Figure 8:
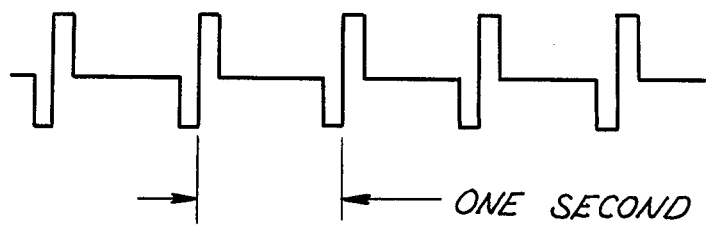
FIG. 8 is a driving wave diagram of the colon in another embodiment of the "second" indicator.

FIG. 8 shows a driving wave form of another embodiment of the colon for displaying seconds, in which reverse currents are applied alternately to remove and produce the image. With this method the coloration and fading of the colon are more distinguishable.

Figure 9:
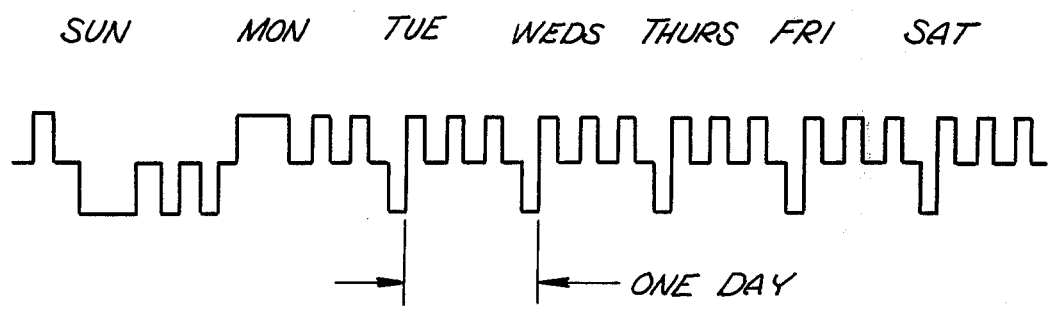
FIG. 9 is a driving wave diagram of a "day" display.

FIG. 9 is a driving wave form of the "day" display 68. An electrochromic material having a long duration of coloration is selected for this display. At present technological level it is difficult for any electrochromic material to maintain the state of coloration for a period longer than 24 hours. Therefore, in order to maintain a 24-hour display, (1) a driving pulse current is sent to the "day" display 68 for coloration, (2) the voltage is shut off, (3) when the color of the electrochromic element (10) begins to fade, a driving current is again applied to revive the coloration. In practice, one electrochromic material having the characteristics described above is neodymium diphthalcyanine. This operation is repeated several times a day so as to keep the "day" display going continuously. In this way the driving time is shortened, and even if a slightly increased amount of electricity is required it still consumes far less power than any other display elements.

With respect to differentiating "Sunday" from the other days in another color, a voltage of a given polarity is applied to the "day" segments for Monday through Saturday, while a voltage of the opposite polarity is applied to the same segments for Sunday. This method enables two-color displays without any undue placement difficulty. The changing of days is done by first removing the previous day by applying a voltage of an opposite polarity, then activating the next day with a driving current. Accordingly, the pulse between "Sunday" and the beginning of "Monday" is increased due to an overlapping of the removing pulse and the driving pulse.

Figure 10:
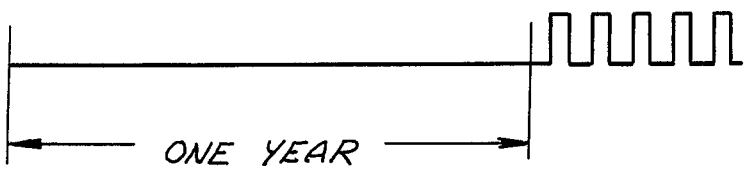
FIG. 10 is a driving wave diagram of a battery warning indicator.

FIG. 10 shows a driving wave form of the battery warning indicator 74. An electrochromic material having a long duration of coloration is used for this indicator. A detection circuit (not shown), coupled to a battery (not shown), gauges the voltage. When the voltage begins to drop toward the end of the battery's life span, the detection circuit sends a momentary pulse to the warning indicator changing the coloration of its electrochromic material 62, and just before the color begins to fade, a driving current is again applied to hold the coloration as in the case of the afore-mentioned "day" display. In the case of the warning indicator, however, it is not necessary to apply a reverse voltage since there is no need to erase any previous display. It is thus clear that the display method of the present invention consumes far less power than the conventional method in which light-emitting diodes, etc. are constantly flashed.

In the above-mentioned embodiments, the entire displays of the timepiece are described in terms of electrochromic elements. While the characteristics of electrochromic elements are best applied to displays of long durations, it is still within the scope of this invention to employ liquid crystal, LED and other display elements in combination with electrochromic elements, using the former for displays of short durations and the latter for those of longer durations.

As described above, the present invention utilizes the characteristics of electrochromic materials as follows:

1. The ability to maintain the state of coloration for a period to time once a voltage is applied;

2. The ability of a single electrochromic material to produce three colors through the application of a voltage of a given polarity, removal of the voltage, and application of a voltage of the opposite polarity;

3. Different kinds of electrochromic materials produce different colors; and

4. A previous coloration can be instantly removed by the application of a voltage of the opposite polarity than that given previously.

When used for display purposes, these characteristics result in a considerable savings in power consumption, enable the manufacture of a smaller, thinner timepiece with a smaller, long-lasting battery, and present colorful design effects.

Although this invention has been closed and described with reference to a particular embodiment, the principles involved are susceptible of other applications which will be apparent to persons skilled in the art. This invention is, therefore, not intended to be limited to the particular embodiment herein disclosed.

We claim:

1. An electronic timepiece having multi-layered electronic display elements in display functions, said timepiece having an oscillator circuit for producing a constant frequency signal, a divider circuit for dividing said signal of said oscillator circuit, and a driving circuit for decoding said divided signals from said divider circuit, said divider circuit coupled to said display element such that said display elements are activated in response to a signal from said driving circuit, said display elements comprising:
    a. a substrate, and substrate made of a transparent material;
    a optical conductive electrode disposed on said substrate, said conductive electrode made of a material which enables light to pass therethrough;
    c. at least one electrochromic material in contact with said optical conductive layer, said electrochromic material being of the type which has a coloration of a first color when a voltage of a first polarity is applied and of a second color when a voltage of second polarity is applied and which fades to transparent sometime after said voltage is removed;
    d. an insulating layer disposed on said electrochromic material such that said electrochromic material is interposed between said insulating layer and said optical conductive electrode; and
    e. a reflective electrode disposed on said insulating layer;
    wherein said signal from said driving circuit is a pulsating signal and is selectively applied to said display elements such that said display elements remain activated during the time when said signal is applied as well as the time when said signal is not applied thereby reducing power consumption of said timepiece and wherein said pulsating signal from said driver circuit causes said display elements to change from transparent to said first color in response to a pulse of a voltage of a first polarity, to change from said first color to transparent in response to a pulse of voltage of a second polarity, and to change from transparent to said second color in response to a pulse of voltage of said second polarity.

2. The timepiece according to claim 1, wherein at least two electrochromic materials of at least two color varieties are used in combination.

3. The timepiece having electrochromic display elements according to claim 1, wherein voltages of reverse polarities are applied to said elements for producing different colors.

4. The timepiece according to claim 1, wherein a display is sustained through the repetitive process of fading the image by decreasing a voltage and reviving said display by reapplying said voltage just before the complete fading of the display, such that said display remains activated during the time when said voltage is applied as well as the time when said voltage is not applied.

5. The timepiece according to claim 1, wherein said salt is selected from the group consisting of neodymium dyphthalocyanine.

* * * * *